United States Patent
Iverson et al.

(10) Patent No.: US 10,328,686 B2
(45) Date of Patent: Jun. 25, 2019

(54) DETERMINING PRINT-TIME FOR GENERATION OF 3D OBJECTS BASED ON 3D PRINTING PARAMETERS

(71) Applicant: Microsoft Technology Licensing, LLC, Redmond, WA (US)

(72) Inventors: Kristofer N. Iverson, Coupeville, WA (US); Lakshmi Narayana Mummidi, Bellevue, WA (US); Parmjeet Singh, Bellevue, WA (US); Louis Tzu Leng Hong, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 28 days.

(21) Appl. No.: 15/289,854

(22) Filed: Oct. 10, 2016

(65) Prior Publication Data

US 2018/0099460 A1    Apr. 12, 2018

(51) Int. Cl.
*G06F 17/50* (2006.01)
*G06T 19/00* (2011.01)
(Continued)

(52) U.S. Cl.
CPC ............. *B33Y 50/02* (2014.12); *B29C 64/20* (2017.08); *B29C 64/386* (2017.08); *B33Y 10/00* (2014.12); *B33Y 30/00* (2014.12)

(58) Field of Classification Search
CPC . G06T 19/00; G06T 2200/08; G05B 19/4099; B33Y 50/00; B33Y 50/02;
(Continued)

(56) References Cited

U.S. PATENT DOCUMENTS 6,652,256 B2 * 11/2003 Coe .................... B29C 67/0059
264/401
8,902,220 B2 * 12/2014 Rolleston .............. G06F 3/1208
345/419
(Continued)

FOREIGN PATENT DOCUMENTS

WO    2013113372 A1    8/2013
WO    2014193311 A1    12/2014

OTHER PUBLICATIONS

"Makerbot Desktop Release Notes", Retrieved on: Jul. 22, 2016 Available at: https://support.makerbot.com/learn/makerbot-desktop-software/release-notes/makerbot-desktop-release-notes_13520.
(Continued)

*Primary Examiner* — Ronald D Hartman, Jr.

(57) ABSTRACT

Methods, systems, and devices are described herein for estimating a three dimensional (3D) print-time for generating a 3D object relative to one or more 3D model or printer parameters. In one aspect, at least one 3D model or printer parameter may be received for generating a 3D object by a 3D printer. Historical print-time data associated with at least one 3D model or printer parameter for generating other 3D objects may be obtained. Based on the received 3D model and printer parameters and the obtained historical print-time data, an estimated print-time for generating the 3D object by the 3D printer may be determined before slicing the 3D model by the 3D printer. In another aspect, a desired print-time for generating a 3D object may be received. One or more 3D model/print parameters may then be configured to achieve or exceed the desired print-time.

20 Claims, 10 Drawing Sheets

(51) Int. Cl.
- *G05B 19/4099* (2006.01)
- *B33Y 50/00* (2015.01)
- *B29C 37/00* (2006.01)
- *B33Y 50/02* (2015.01)
- *B33Y 30/00* (2015.01)
- *B33Y 10/00* (2015.01)
- *B29C 64/20* (2017.01)
- *B29C 64/386* (2017.01)

(58) Field of Classification Search
CPC ....... B29C 37/00; B29C 64/00; G06F 3/1208; G06F 3/1256; G06F 17/50
See application file for complete search history.

(56) References Cited

U.S. PATENT DOCUMENTS

| | | | |
|---|---|---|---|
| 9,266,287 B2* | 2/2016 | Kautz | B29C 67/0088 |
| 9,304,332 B2 | 4/2016 | Fonte et al. | |
| 9,747,394 B2* | 8/2017 | Nelaturi | G06F 17/5009 |
| 2011/0188061 A1* | 8/2011 | Miyamoto | G06K 15/16 |
| | | | 358/1.12 |
| 2012/0092724 A1 | 4/2012 | Pettis | |
| 2012/0162202 A1* | 6/2012 | Rolleston | G06F 3/1208 |
| | | | 345/419 |
| 2014/0279177 A1 | 9/2014 | Stump | |
| 2014/0288699 A1* | 9/2014 | Williams | B29C 67/0085 |
| | | | 700/233 |
| 2015/0045928 A1* | 2/2015 | Perez | B29C 64/112 |
| | | | 700/110 |
| 2015/0098111 A1* | 4/2015 | Hoarau | G06F 3/1208 |
| | | | 358/1.15 |
| 2015/0134096 A1* | 5/2015 | Travers | B29C 67/0088 |
| | | | 700/98 |
| 2015/0165685 A1* | 6/2015 | Klappert | B29C 67/0088 |
| | | | 700/98 |
| 2015/0190970 A1* | 7/2015 | Itagaki | G06T 15/02 |
| | | | 700/98 |
| 2015/0331402 A1* | 11/2015 | Lin | G06F 17/5009 |
| | | | 700/119 |
| 2016/0054726 A1 | 2/2016 | Yoo et al. | |
| 2016/0159012 A1* | 6/2016 | Lee | G05B 19/41865 |
| | | | 700/98 |
| 2016/0185043 A1* | 6/2016 | Klappert | B29C 67/0088 |
| | | | 264/40.1 |
| 2016/0209819 A1* | 7/2016 | Cudak | G05B 15/02 |
| 2016/0271881 A1* | 9/2016 | Bostick | B29C 67/0088 |
| 2016/0274572 A1* | 9/2016 | Littrell | G06F 17/50 |
| 2017/0173889 A1* | 6/2017 | Thomas-Lepore | G06F 21/31 |
| 2017/0218660 A1* | 8/2017 | Muchna | E05B 47/0002 |
| 2017/0358133 A1* | 12/2017 | Iverson | H04N 13/106 |
| 2017/0359315 A1* | 12/2017 | Zhang | B33Y 50/00 |
| 2018/0022031 A1* | 1/2018 | Ishii | B29C 64/386 |
| 2018/0147838 A1* | 5/2018 | Harayama | B29C 64/112 |

OTHER PUBLICATIONS

Nutsch, Matt, "Estimating Print Time", Published on: Jan. 28, 2016 Available at: http://www.makexyz.com/f/estimating-print-time-7ae2fe0cb09b3a8ca4e080a52c66e0b0.

Mai, et al., "Customized production based on distributed 3D printing services in cloud manufacturing", In International Journal of Advanced Manufacturing Technology, Oct. 14, 2015, 14 pages.

* cited by examiner

DETERMINING PRINT-TIME FOR GENERATION OF 3D OBJECTS BASED ON 3D PRINTING PARAMETERS

TECHNICAL FIELD

This disclosure relates generally to three-dimensional (3D) printing or additive manufacturing, and more specifically to estimating print-time for the generation of one or more 3D objects.

BACKGROUND

The use and technology associated with 3D printing is ever increasing, such that more complex objects may be generated in less time than previously possible. However, current 3D printing and generation techniques do not provide for effective ways to schedule the completion of 3D print jobs. This can be particularly frustrating and create large delay, for example, in generating multiple complex and/or large 3D objects. As many 3D print jobs take more time to complete than would allow a user to wait/watch the 3D printer complete a certain object, many times, 3D print jobs must be completed overnight. This can generate delay, for example, such as in the case where multiple objects, each taking an unknown amount of time to complete, need to be printed by a fast approaching deadline. Some 3D printers may estimate a time to complete a print job, but this is done after the 3D printing process has started.

Accordingly, improvements can be made in ways to schedule and estimate the time to complete a 3D printing job.

SUMMARY

Illustrative examples of the disclosure include, without limitation, methods, systems, and various devices. In one aspect, a method for estimating a three dimensional (3D) print-time for generating a 3D object relative to one or more 3D model or printer parameters may include receiving at least one 3D model or printer parameter for generating a 3D object by a 3D printer. Historical print-time data associated with at least one 3D model or printer parameter for generating other 3D objects may be obtained. Based on the received 3D model and printer parameters and the obtained historical print-time data, an estimated print-time for generating the 3D object by the 3D printer may be determined before slicing the 3D model by the 3D printer.

In another aspect, a desired print-time for generating a 3D object may be received. One or more 3D model/print parameters may then be configured to achieve or exceed the desired print-time.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
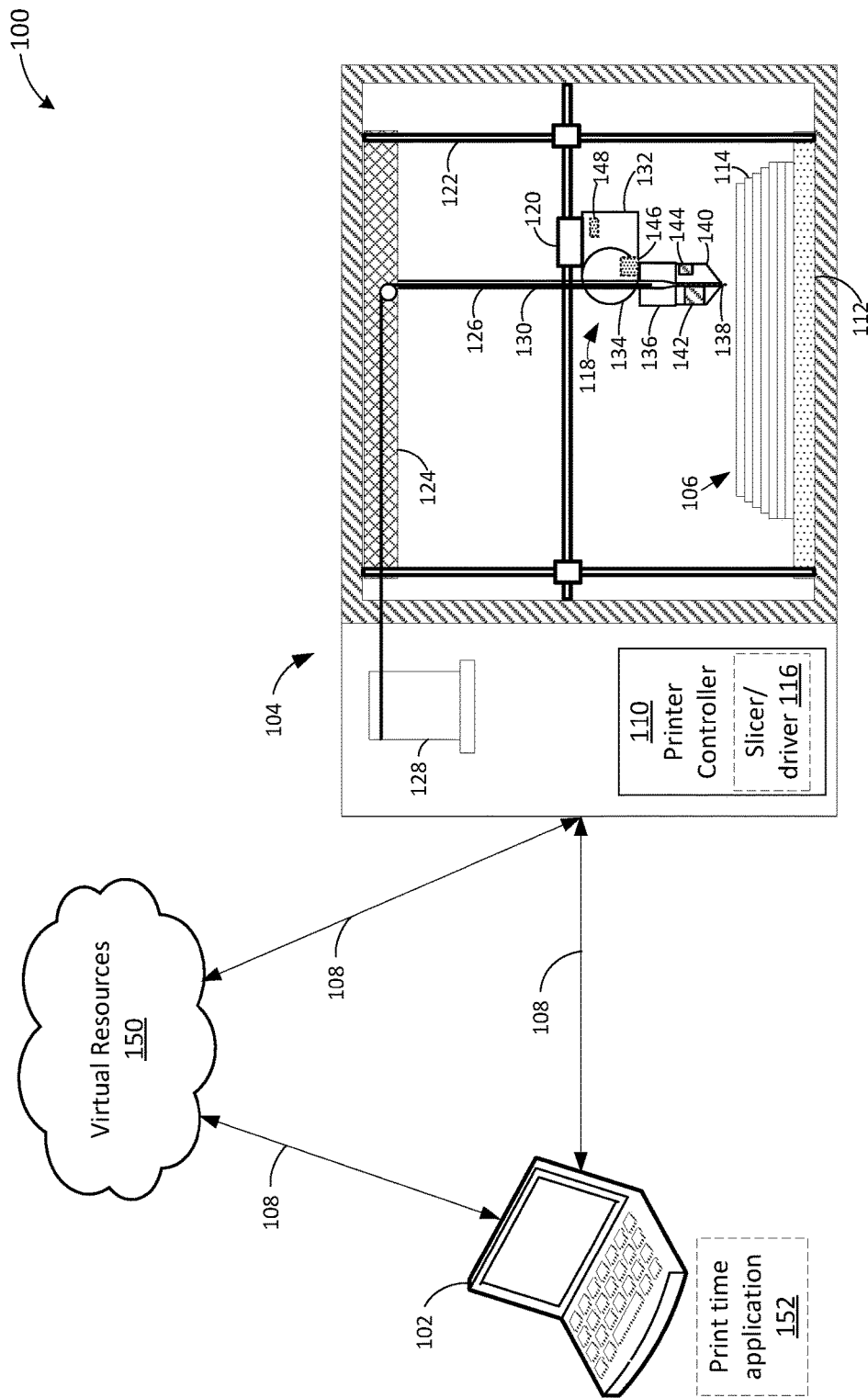
FIG. 1 depicts an example of a computing device and virtual resources both in communication with a three-dimensional (3D) printer capable of printing a 3D object.

Systems and techniques are described herein for determining an estimated print-time or generation time, for a 3D object to be generated by a 3D printer or other 3D generation device, based on one or more model or printer parameters. In one aspect, one or more 3D model or printer parameters may be received from a user for a print job, for example via a 3D modeling or printer application, such as through one or more graphical user interfaces. Based on historical data of other 3D objects being generated (or the same object by the same or a different printer), an estimated print time for the 3D object, for a specific 3D printer or generation device, may be determined. The described techniques may be performed before the 3D model is sent to the 3D printing device for slicing and printing. As will be described in greater detail below, an estimation of print-time for a 3D object, prior to actually commencing the printing operation, may be particularly useful, in that print jobs may be more effectively scheduled and managed. In some aspects, the 3D model/printer parameters may be exposed to the user, for example, via a user interface, which may additionally enable modification or adjustment of the parameters, to in turn change the estimated print-time. By exposing and enabling modification of the 3D modeling and printers parameters with the estimated print-time, a user may change 3D model and printers parameters to adjust the print-time for the 3D object in real or near-real time.

The historical data may include a print-time and one or more 3D model or printer parameters. In some cases, the 3D model parameters may include any of a mesh count of the 3D model to be printed, triangle count of the model to printed, a bounding box or volume of the 3D model, or other 3D model related values. The 3D printer parameters may include any of a quality setting, a density setting, a raft setting, a support setting, a 3D printer type, a number of materials to be used to generate the 3D object, material information for generating the 3D object, or other related values. In some aspects, the print-time may include a total time to print, or a completion time.

In some cases, the historical data may include multiple data points that correlate print-time of another object on the same or different 3D printer or generation device (or the same object on the same or a different 3D printing device), with one or more 3D modeling or print parameters. Based on the historical data, a confidence level of the print-time estimate may be generated. In some examples, the user interface may display the confidence level, for example, to enable the use to determine the likelihood by which the print job will be completed within the estimated time. In some cases, the determined confidence level of the print-time estimate may be compared to a confidence threshold, and one or more parameters or the print-time may be adjusted to meet or exceed the confidence threshold. In some cases, machine learning may be used, with the data points, to optimize or increase the accuracy or confidence in the print-time estimation.

In another aspect, a desired print-time may be received, for example as entered by a user into a user interface associated with a 3D modeling or printing application. Using historical data of print-times of other 3D objects (or the same 3D object on the same or a different 3D printer or 3D generation device) associated with one or more 3D model or printer parameters, one or more 3D model or printer parameter may be adjusted or selected to achieve or exceed the desired print-time. In some cases, one or more 3D model or printer parameters may be received with the print-time. In some aspects, 3D model or printer parameters other than the received parameter may be adjusted/selected to achieve the desired print time, for example, before modifying the received parameters.

It should be appreciated that the described techniques may be applied to various 3D object generation techniques utilizing one or more filaments of material (e.g., acrylonitrile butadiene styrene (ABS), polylactic acid (PLA), Nylon, composite plastic blends), foodstuff (e.g., chocolate, icing) et al., and using extrusion techniques including fused deposition modeling (FDM), fused filament fabrication (FFF), or other types of additive manufacturing techniques that use a slicing method.

FIG. 1 illustrates an example system 100 including a computing device 102 in communication with a three dimensional (3D) printer 104 capable of or configured to print a 3D object 106, both of which can communicate with one or more virtual/network resources 150. The computing device 102 may include any of a laptop, a desktop or personal computer (PC), mobile devices such as smart phones, tablets, etc., networked devices, cloud computing resources, or combinations thereof. The computing device 102 may communicate with 3D printer 104 via a wired connection or any of a variety of wireless connections 108, as are known to one of skill in the art. The 3D printer 104 may have or be associated with any of a variety of transceivers, modems, NICs, etc., typically associated with the printer controller 110, to communicate with computing device 102 via wired and/or wireless connection 108. In general, the computing device 102 may execute or access (via a network or via the cloud), one or more software programs or applications that take 3D object data and translate the data into instructions (e.g., G-code) executable by the printer controller 110 to control the 3D printer 104 to cause 3D printer 104 to form 3D object 106 by extruding material onto the base 112 in multiple (e.g., separately) configurable layers 114. For reference purposes, and as used throughout, a software application, which may in some cases include a computer aided design (CAD) component, a computer aided manufacturing (CAM) component, 3D image capture and translation functions, and so on, may be referred to as slicer or driver 116. Slicer 116 may in whole or in part be associated with an individual 3D printer 104, such as a component of printer controller 110, or with computing device 102 (not shown).

The 3D printer 104 may include one or more extruder assemblies 118 positioned over an object base or bed 112. The extruder assembly 118 may be moved in one or more directions by movement means 120, which may include one or more stepper or servo motors, along rail system 122, as is generally known in the art. The movement means 120 may move the extruder assembly 118 in the vertical plane (z axis), and/or the horizontal plane (x or y axis), such as relative to the upper plate 124 and the base 112 along rail system 120. Other 3D printer 104 designs fix the extruder 118 in the z-axis and move it in the x-axis and y-axis while moving the bed 112 in the z-axis. Yet other designs move the extruder 118 in the z-axis and x-axis while moving the bed 112 in the y-axis. Still other designs operate using a polar coordinate system to move the extruder 118 over a stationary bed 112. The techniques described herein are applicable to these and other variations of 3D printer configurations (such as Delta Parallel Kinematic printers). In some aspects, the extruder assembly 118 may be configured to receive and extrude one or more filaments 126 supplied from one or more spools 128 upon which filament is wound/stored, and typically located apart from the extruder 118. In other cases, the filament 126 may be stored or housed in other portions of the 3D printer 104 or completely external to the 3D printer 104. The filament 126 may be housed in a filament casing 130, for example, to deliver the filament 126 to the extruder 118 unobstructed.

The extruder assembly 118 may include a motor 132 or other drive means connected to one or more drive gears 134 that move and control the rate at which the filament is delivered to hotend 136 via a rolling assembly (not shown). Other extruder assemblies (e.g., a Bowden extruder (not shown)) are configured with the motor 132 or other drive means connected to one or more drive gears 134 apart from the moveable extruder hotend 136, fixed to a stationary part of 3D printer 104 closer to the one or more filament spools, and with the filament routed through a filament guide to moveable extruder hotend 136. The hotend 136 may heat the filament 126 and extrude the viscous liquid filament 138 through nozzle 140 onto bed 112 or prior layer 114 to form 3D object 106. The hotend 136 may include a heating element 142 for heating the filament 126 into a viscous liquid state. The heating element 142 may be controlled to heat the filament at different rates or temperatures, etc. The hotend 136 may also include one or more temperature sensors 144 to aid in controlling heating element 142 during idle or active periods of 3D object generation.

According to one aspect of the techniques described herein, a print-time application 152 may be associated with or executing on computing device 102. The print-time application 152 may estimate a print-time for any of a number of 3D objects to be generated on 3D printer 104, for example based on one or more parameters associated with generating the 3D object by 3D printer 104. In some aspects, the print-time application 152 may communicate with 3D printer 104, for example to obtain 3D printer specifications, such as 3D printer type, and other specifications, and 3D print-job parameters, such as quality settings, density settings, a raft settings, a support settings, a number of materials to be used to generate the 3D object, material information for generating the 3D object, dimensions of the object to be generated (e.g., the bounding box), triangle count of the object, mesh count of the object, or other related values. In some cases, the 3D printer specifications may be retrieved or obtained as part of a device configuration request, either during installation of the 3D printer or discovery of the 3D printer, for example, by a client computing device, over a network, etc. The print-time application 152 may also obtain slicing information from slicer 116, such as how many layers the 3D model will be split up into for 3D printing, the layer height, etc.

The print-time application, in some aspects, may obtain historical data of other print-times associated with one or more 3D model or printer parameters for 3D objects locally, for example, stored in memory of computing device 102 for 3D printer 104 and/or other 3D printers 104. In other cases, the computing device 102 may communicate with one or more virtual/network resources 150 to obtain historical print-time data associated with one or more 3D model or printer parameters and one or more 3D printing devices. Virtual/network resources 150 may include any data storage, for example that may receive, compile, and/or organize historical data relating to print-times and one or more associated 3D model or printer parameters.

The print-time application 152 may use some or all of the information described above to estimate a print-time for the generation of 3D object 106 by 3D printer 104. The techniques by which the print-time application may estimate print-time will be described in greater detail below.

Additionally or alternatively, the print-time application 152 may receive a print-time and configure one or more 3D model or printer parameters to meet or exceed the desired print-time. In some aspects, configuring one or more 3D model or printer parameters may include using historical data, either stored locally or accessed via virtual resources 150, of print-times associated with one or more 3D model or printer parameters to select values for one or more parameter(s). In some cases, one or more parameters may be selected to maximize or optimize visual or aesthetic quality of the 3D object, while still generating the 3D object within the selected print-time.

In either of the above examples, the historical data may be used to associate weights with the one or more 3D model or printer parameters. The weights of each of the parameters may determine to what extent each parameter affects the print-time estimation/selected print-time. In some aspects, machine learning may also be used in conjunction with historical data to further improve the accuracy of print-time estimation and the contributions of different 3D model and printer parameters on that determination.

In some aspects, upon completion of printing 3D object 106, the 3D print-time application 152 may record the print-time and compare it to the estimated print-time. In some aspects, the weighting of the different model and printer parameters may be modified, for example, if the estimated print-time is different from the actual print-time, such as to improve the accuracy of future print-time estimations and 3D model and printer parameter configuration.

Figure 2:
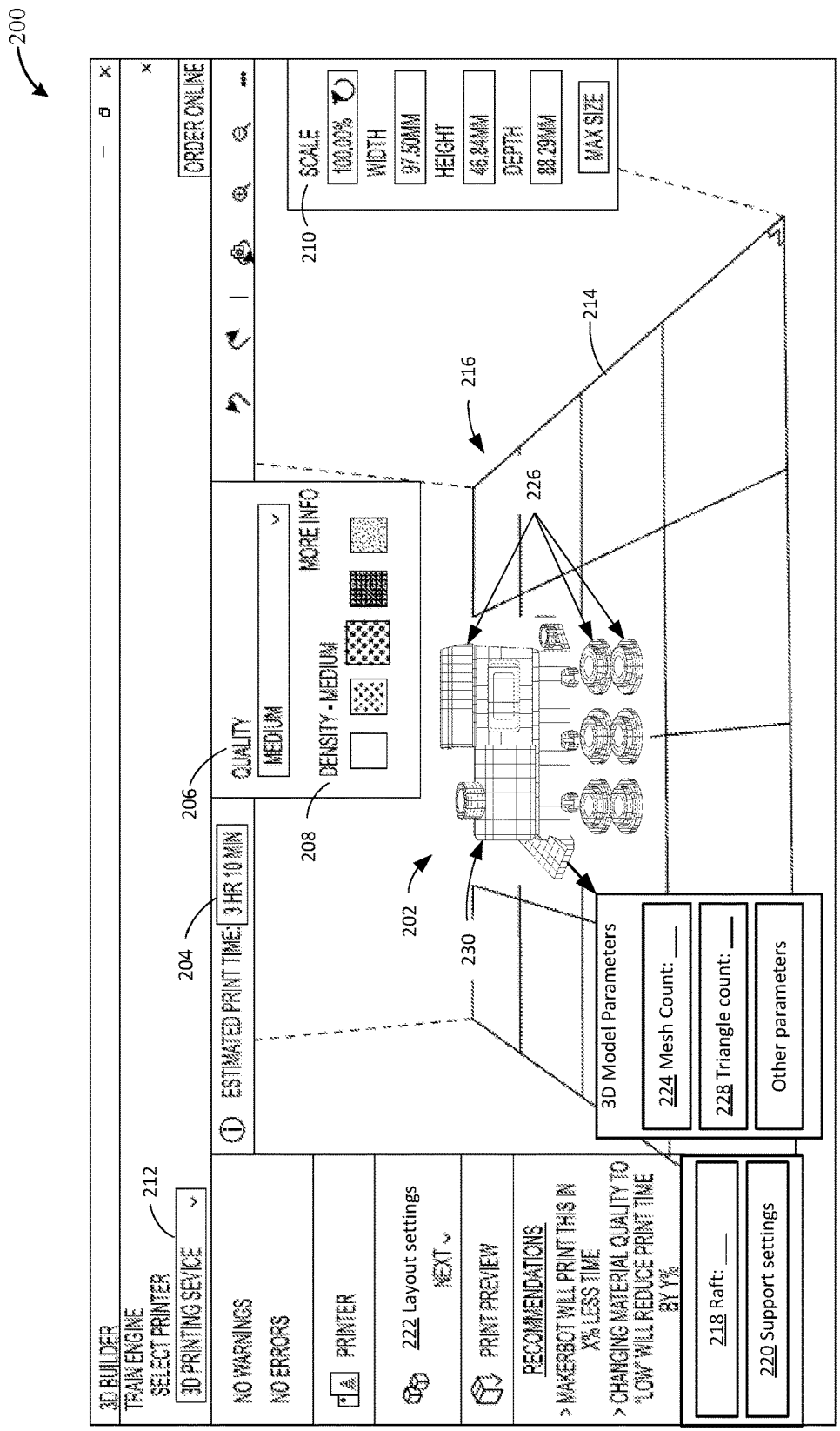
FIG. 2 depicts an example graphical user interfaces for adjusting one or more print parameters and/or selecting a print-time for generating a 3D object.

In some aspects, print-time estimation and the configuration of the 3D model and printer parameters, and the interactions thereof, may be provided by one or more user interfaces associated with 3D printing/modeling applications. FIG. 2 illustrate an example user interfaces (UI) 200 that may provide selection items and displays for selecting print-times and/or modifying one or model of print parameters for generating a 3D object 202.

In the example UI 200 of FIG. 2, an estimated print-time may be displayed in item 204. Print-time displayed in item 204 may be in the form of a length of time to print, or a completion time (e.g., assuming that 3D printing is started immediately or with short delay). Various selection items or indications of parameters for generating the 3D object 202 may be provided, such as a quality item 206, a density item 208, one or more size or scale items 210, and so on. The quality item 206 may enable selection of a range of quality settings, such as low, medium, high, or other schemes used to identify quality, which may relate to speed, step-size, etc., of the 3D printer. The density item 208 may enable selection/display of different grades of how much material will be used to generate the 3D object(s) 202. The one or more size or scale items 210 may include an indication of scale, width, height, and depth. A selection for different configured 3D printers 212 may additionally be provided. In some aspects, UI 200 may provide a visualization of the max size capable by a selected 3D printer, such as via a grid on print bed/plane 214 in a 3D modeling space 216 containing the 3D object 202, to aid in configuring the layout of one or more 3D objects 202.

In some aspects, UI 200 may also include selection or display item 218 for the raft setting of the 3D printer, which may include a number of layers (typically 3-4 layers) of material to be generated by the 3D printer prior to the actual model be printed. Additionally or alternatively, a support setting item 220 may be provided that displays one or more settings for configuring supporting material to be configured and generated for overhanging portions of 3D object 202, for example, relative to a print bed of the 3D printer, which may be visualized as plane 214 of 3D modeling space 216. In some aspects, layout configuration item 222 may reconfigure the layout of one or more 3D objects, for example, to minimize overhang, for example, to affect the estimated print-time.

In some aspects, one or more parameters associated with the 3D object/model 202 may also be displayed and/or modified via UI 200. In one aspect, upon selecting one or more of 3D objects 202, a separate selection box or window may be displayed, which may include a mesh count item 224, a triangle count 228, and other model specific parameters or settings. The mesh setting may display and/or enable modification of how many separate objects 226 will be printed by the 3D printer. In the example illustrated, the mesh count would equal seven: six wheels and one train body. The mesh count item 224 may enable combination or separation of different objects in the 3D model, for example to reduce the print-time or increase the quality of the 3D model when generated. The triangle count 228 may indicate a number of triangles 230 located on the surface of a 3D object used to define the 3D object 202. The number of triangles 230 of a 3D model/object 202 may represent the complexity of the 3D object 202, such that more complex models may take a longer time to print. Triangle count item 228 may enable modification of the complexity of the 3D model, for example by increasing or decreasing the number of triangles 230 used to define the 3D object 202, and hence the number of points used to drive the 3D printer. In some cases, object orientation, such as settling the 3D object on the print bed may also affect print time.

Figure 3:
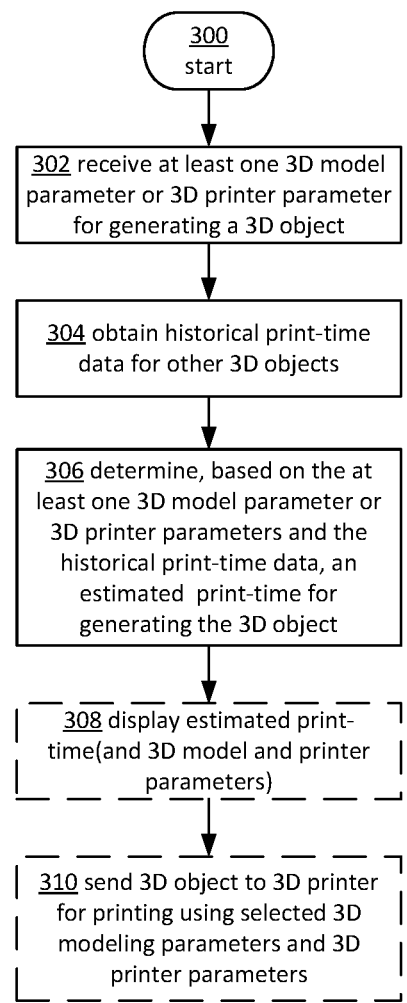
FIGS. 3 and 4 depict example processes for estimating a print-time for 3D printing of a 3D object based on one or 3D modeling parameters or 3D printing parameters.

FIG. 3 depicts an example process 300 for estimating a print-time for 3D printing of a 3D object based on one or 3D modeling parameters or 3D printing parameters. Process 300 may be performed at least in part by one or more of computing device 102, print-time-application 152, virtual resources 150, and/or 3D printer 104, and/or may utilize UI

200, as described above in reference to FIGS. 1 and 2. As used herein, a box or operation indicated via dotted lines may be optional, such that the illustrated process may be performed without the optional operation.

In one aspect, process 300 may begin at operation 302, in which at least one 3D model parameter or at least one 3D printing parameter for generating at least one 3D object may be received. In some cases, the at least one 3D model parameter or at least one 3D printing parameter may be received via UI 200, as described above. A 3D model parameter may include any of a mesh count of the 3D model, a triangle count of the 3D model, a bounding box of the 3D model, or other model defining parameters, such as one or more dimensions, etc. The 3D printer parameter may include any of a quality setting, a density setting, a raft setting, a support setting, a 3D printer type, a number of materials to be used to generate the 3D object, or material information (e.g., type, color, density, etc.) for generating the 3D object.

Next, at operation 304, historical print-time data may be obtained for one or more other 3D objects. In some cases, historical data may be obtained locally, for example from memory of a computing device on which process 300 is being performed, from 3D printer in communication with the computing device, or from a remote memory location, such as a database of printing configurations compiled from multiple users, 3D printers, etc. In some cases, local historical data may be weighted more heavily than remote historical data, for example, because the local data may be more specific to the particular 3D printer to be used to generate the 3D object.

At operation 306, based on the at least one received 3D printer or model parameter, and the historical data, an estimated print-time for generating the 3D object or objects may be determined. Operation 306 will be described in greater detail below, in reference to FIGS. 4 and 5.

In some aspects, process 300 may also include operation 308, in which the estimated print time may be displayed, for example, via UI 200. In yet some aspects, the 3D printer and 3D modeling parameter(s) used to estimate the print-time may also be displayed, for example, via UI 200. The configured 3D object (or model thereof) may then be sent to a 3D printer for printing using the 3D model and/or printer parameters. In some cases, a 3D model may first or initially be associated with a default set, or user selected set, of mode and/or printing parameters. According to the techniques described herein, one or more of those parameters may then be adjusted, either manually or automatically, for various reasons (e.g., to change the look, quality, etc. of a 3D object to be generated based on the 3D model, to change the print-time, etc.). The print-time may be estimated based on either the default set or parameters or the adjusted set of parameters.

Figure 4:
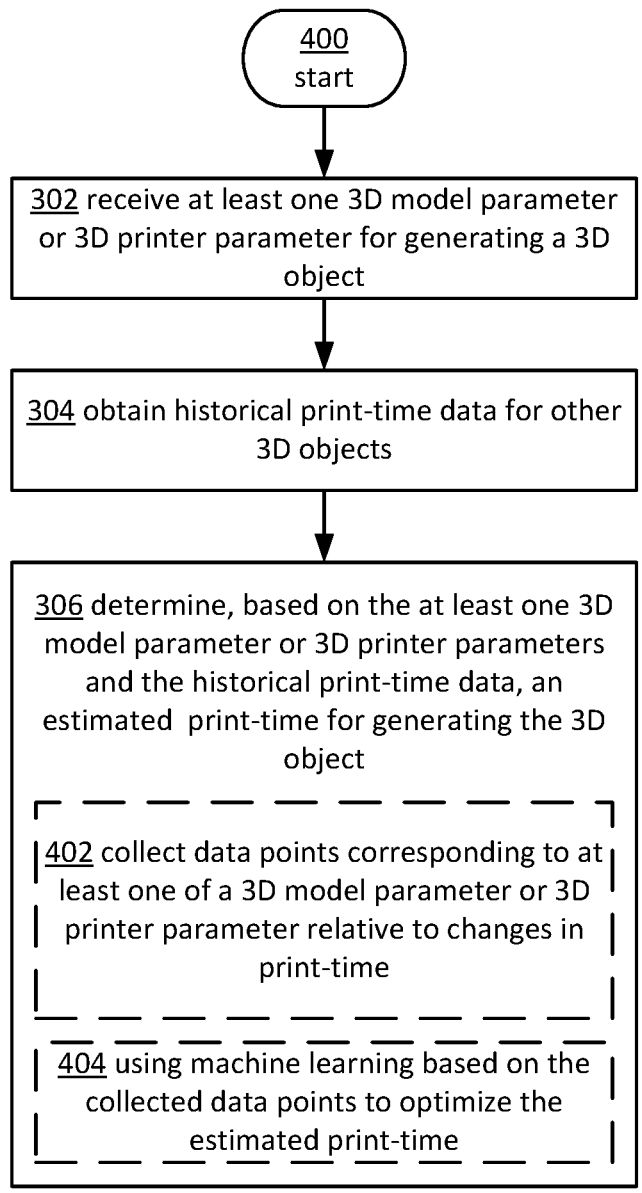

FIG. 4 depicts another example process 400 for estimating a print-time for 3D printing of a 3D object based on one or 3D modeling parameters or 3D printing parameters. Process 400 may be performed at least in part by one or more of computing device 102, print-time-application 152, virtual resources 150, and/or 3D printer 104, and/or may utilize UI 200, as described above in reference to FIGS. 1 and 2.

Process 400 may being with operations 302 and 304, as described above in reference to FIG. 3. For the sake of brevity, these operations will not be described again here. Upon obtaining the historical print time data, at operation 304, process 400 may continue to operation 306, where based on the at least one received 3D printer or model parameter, and the historical data, an estimated print-time for generating the 3D object or objects may be determined. In some aspects, operation 306 may further include operations 402 and/or 404.

At operation 402, determining an estimated print-time may further include collecting data points corresponding to at least one of a 3D model parameter or a 3D printer parameter relative to changes in print time. In some cases, operation 402 may include searching in the historical data for actual or estimated print-times for 3D objects that have one or more characteristics or parameters in common. For example, if a certain mesh count is selected for the current 3D model, data points of prior 3D prints corresponding to that mesh count and other mesh counts may be collected, if available. Each data point may include one or more 3D model or printer parameters and an estimated print time or the actual print time, or both. In some aspects, one or more of the data points may include multiple 3D model or printer parameters. Data points may be selected/collected based on a number of parameters the data point has in common or proximate to the current print job. For example, a data point corresponding to a print job that has the same triangle count and bounding box and was generated using the same material and/or same 3D printing device may be selected as it closely corresponds to the current 3D print job, over a data point that has less parameters in common or close to the current print job. In some cases, certain parameters or characteristics associated with historical data points may be more heavily weighted in determining the most relevant data points for estimating a print-time of a current print job. For example, the number of different material used for generating a 3D object may affect the print-time more, than for example, the type of material used. In some cases, this weighting may be determined experimentally over time, such that collecting relevant data points may become more accurate over time, based on the weighting information.

Operation 306 may further include using machine learning, at operation 404, based on the collected data points, to optimize an estimated print-time. In some cases, operation 404 may include estimating which data points are closest to or more relevant to the current print-time estimation, based on which factors contribute the most to changes in the estimated print-time. In some cases, operation 404 may further include using machine learning to determine how much a change in one or more parameters will affect the actual print-time of the current 3D object. This may include determining how much a change in one parameter relative to one or more other parameters, will affect the final print-time. This may further include determining which parameters do not affect the print-time to a significant extent, for example, when one or more other parameters are kept constant. In yet some examples, other conclusions, relationships, computational shortcuts, and the like, may be determined experimentally or experientially over time using machine learning techniques.

In some cases, operation 404 may further include determining which parameters to change that will result in the most aesthetically pleasing generated 3D object, while minimizing the print-time. In this scenario, the data points may also be associated with a user feedback, such as that rate the final outcome generated according to one or more 3D model and/or printer parameters (e.g., on a scale of 1 to 10, 1 to 100, etc.). The collection/selection of data points may further take user feedback/aesthetic ratings into account.

Figure 5:
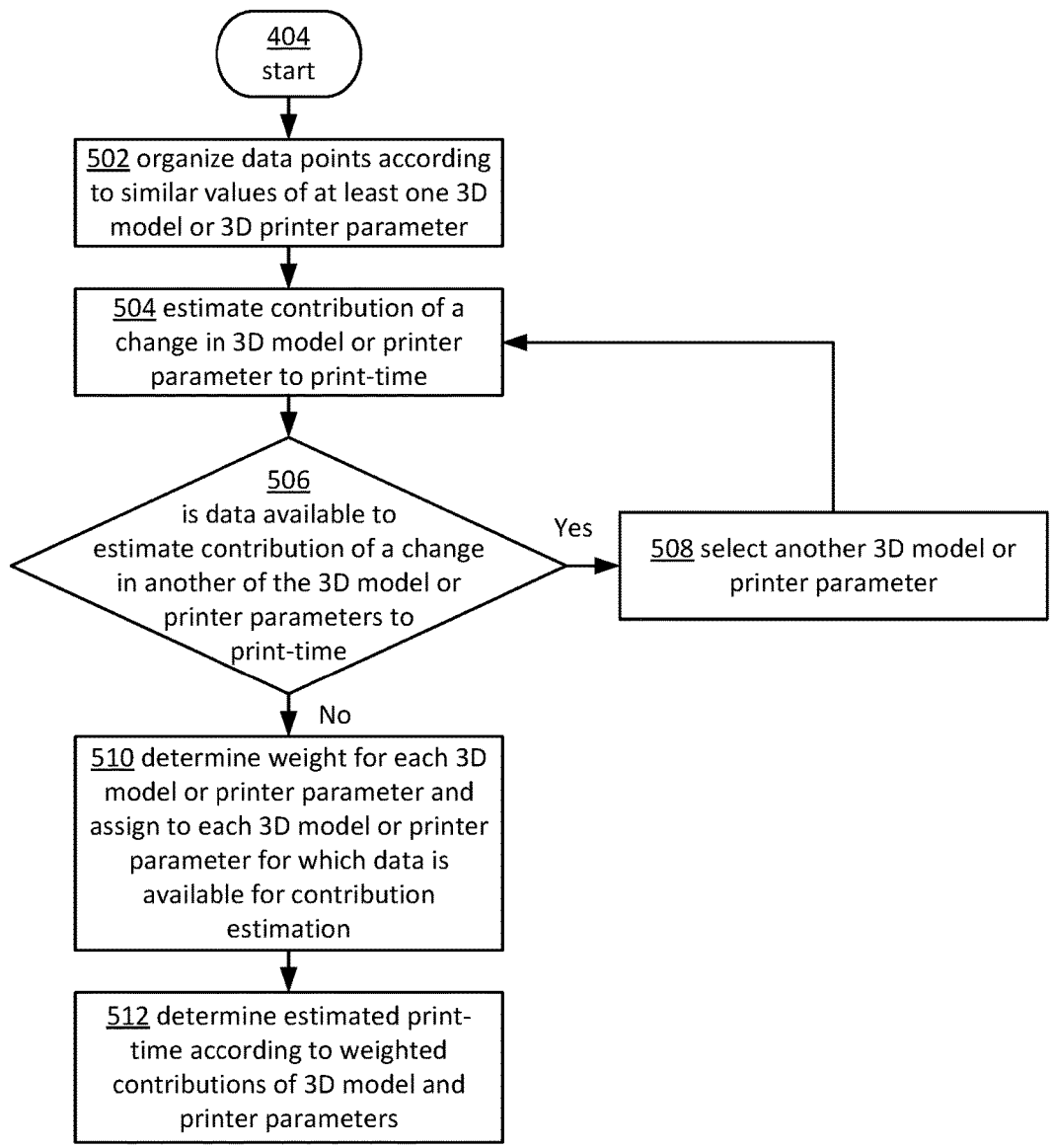
FIG. 5 depicts an example process for using machine learning to improve the accuracy of the print-time estimation generated by process 400 of FIG. 4.

FIG. 5 depicts a more detailed example of operation 404 described above in reference to FIG. 4 for using machine learning based on the collected data points to optimize the estimated print-time. In one example, operation 404 may include operations 502 through 512, as described below.

At operation 502, the data points collected in operation 404 may be organized according to one or more similar values of at least one 3D model parameter or 3D printer parameter. In some aspects, operation 502 may include organizing the data points according to which parameters impact print-time and/o aesthetical quality of the 3D object the most. Next, at operation 504, the contribution of a change in one 3D model or printer parameter to print-time (and/or aesthetic quality) may be estimated. At operation 506, it may be determined if data is available to estimate the change in print-time based on another parameter. If there is available data, another 3D model or printer parameter may be selected, at operation 508, and a contribution of the new parameter to print-time (and/or aesthetic quality) may be estimated at operation 504. Operation 404 may loop through operations 504, 506, and 508 until data for additional parameters is not available. At this point, operation 404 may proceed to operation 510, where a weight for each 3D model or printer parameter's contribution to print-time (and/or aesthetic quality) may be determined and assigned to each 3D model or printer parameter. Next, at operation 512, the estimated print-time for the current 3D object(s) may be determined according to the weighted contributions of each relevant 3D model or printer parameter.

Figure 6:
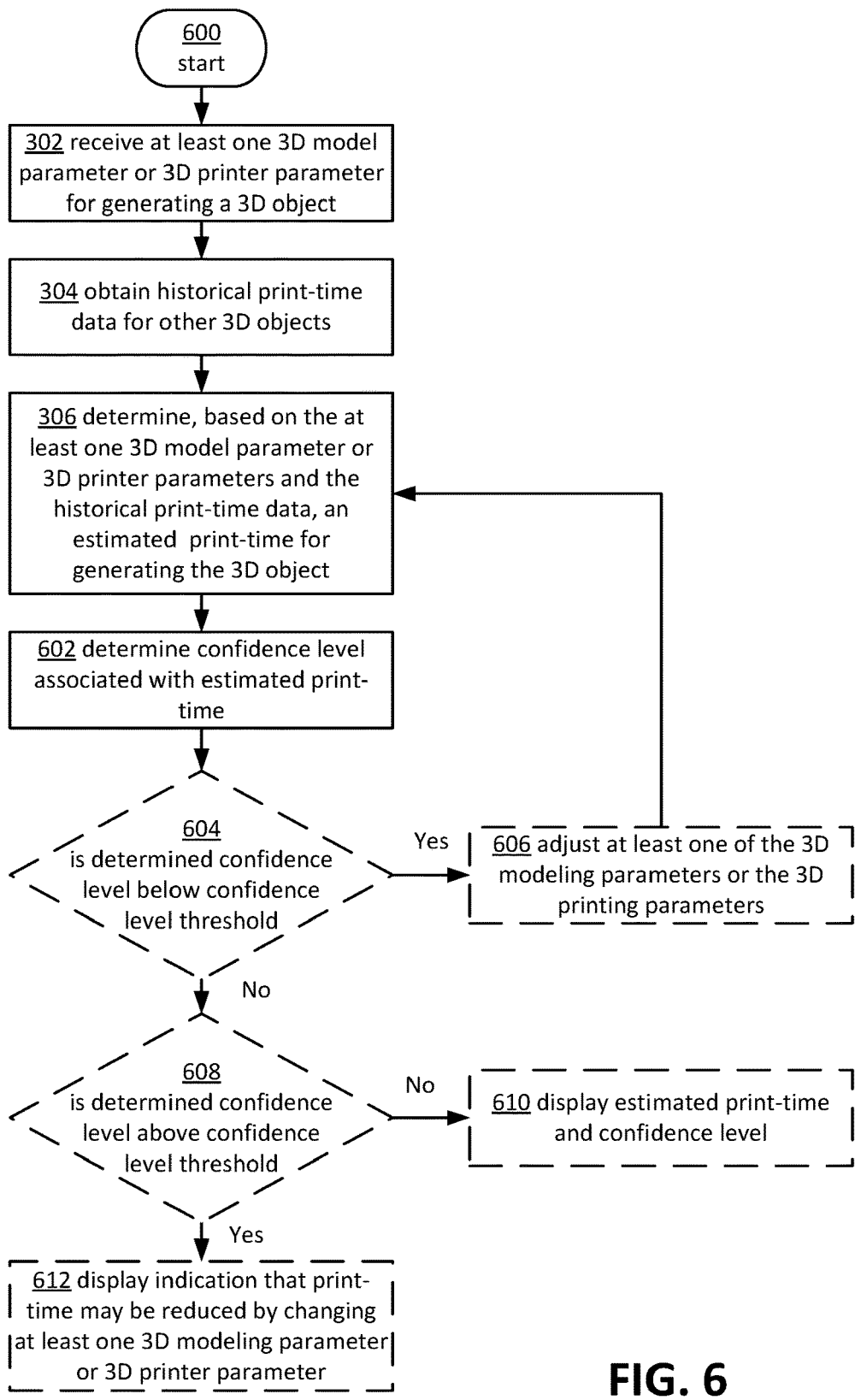
FIG. 6 depicts an example process for estimating a print-time for 3D printing of a 3D object based on one or more 3D modeling parameters or 3D printing parameters and providing a confidence level of the estimation.

FIG. 6 depicts an example process 600 for estimating a print-time for 3D printing of a 3D object based on one or more 3D modeling parameters or 3D printing parameters and providing a confidence level of the estimation. Process 600 may be performed at least in part by one or more of computing device 102, print-time-application 152, virtual resources 150, and/or 3D printer 104, and/or may utilize UI 200, as described above in reference to FIGS. 1 and 2.

Process 600 may begin at and include operations 302, 304, and 306, as described above. In some cases, operation 306 may include operations 402 and 404, and/or operations 502, 504, 506, 508, 510, and 512, as also described above. Upon determining an estimated print-time for the generation of one or more 3D objects at operation 306, process 600 may proceed to operation 602, where a confidence level associated with the estimated print-time may be determined. In some aspects, the confidence level may be determined based on a number of data points that share one or more or a configurable number of parameters with the current print job, proximity of one or more parameters of one more data points with the current print job, changes in print-time relative to changes in one or more parameters, etc.

At operation 604, it may be determined if the confidence level is below a confidence level threshold, which may be configurable. If the determined confidence level is below the threshold, process 600 may continue to operation 606, where at least one of the 3D model or printer parameters may be adjusted. Process 600 may then loop back through operations 306, 602, and 604, and the same or different parameters adjusted until the determined confidence level is not below the threshold. Upon this determination, process 600 may continue to operation 608, where it may be determined if the determined confidence is above the confidence threshold. If not, the estimated print-time and confidence level may be displayed, for example, via UI 200, upon which a user may select to print the 3D object according to the set parameters. If the determined confidence level is above the threshold, for example by a set or configurable amount (e.g., 5% above, 10% above, 20% above, etc.), then process 600 may continue to operation 612, where an indication that the print-time may be reduced by changing one or more parameters may be displayed, for example via UI 200.

Figure 7:
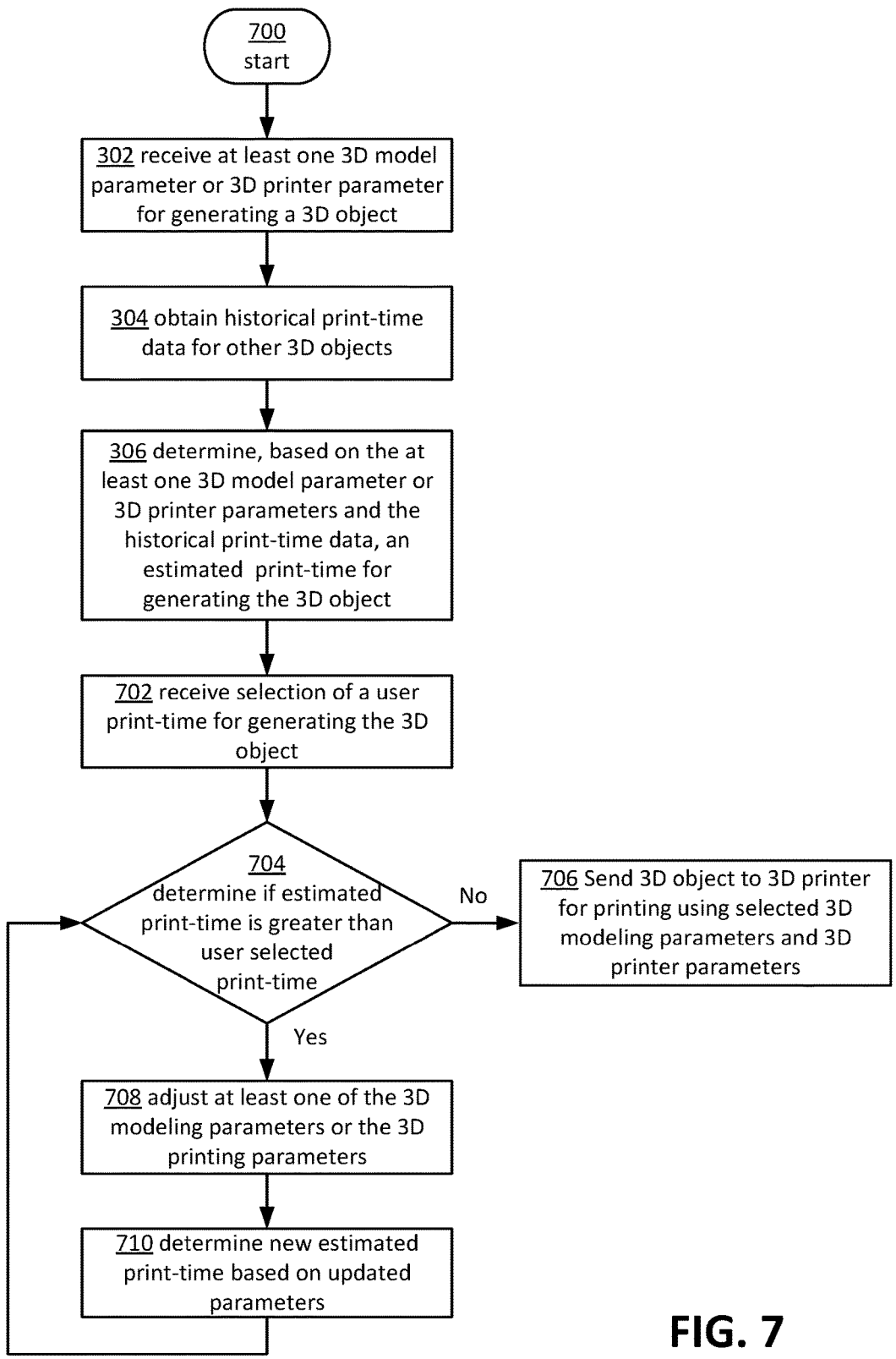
FIG. 7 depicts an example process for modifying one or more 3D modeling parameters or 3D printing parameters to complete the generation of a 3D object within a received print-time.

FIG. 7 depicts an example process 700 for modifying one or more 3D modeling parameters or 3D printing parameters to complete the generation of a 3D object within a received print-time. Process 700 may be performed at least in part by one or more of computing device 102, print-time-application 152, virtual resources 150, and/or 3D printer 104, and/or may utilize UI 200, as described above in reference to FIGS. 1 and 2.

Process 700 may begin at and include operations 302, 304, and 306, as described above. In some cases, operation 306 may include operations 402 and 404, and/or operations 502, 504, 506, 508, 510, and 512, as also described above. Upon determining an estimated print-time for the generation of one or more 3D objects at operation 306, process 700 may proceed to operation 702, where a selection of a user desired print-time for generating one or more 3D objects may be received, for example, via UI 200. Next, at operation 705, it may be determined if the estimated print-time, from operation 306, is greater than the user selected print-time. If the estimated print-time is not greater than the user selected print-time, the 3D object may be sent to the 3D printer for printing using the selected or conjured 3D model and/or printer parameters, at operation 706. If the estimated print-time is greater than the user selected print-time, one or more of the 3D model or printer parameters may be adjusted, at operation 708. Next, at operation 710, a new estimated print time may be determined based on the new parameter(s). Process 700 may then loop back to operation 704, where the new estimated print time may be compared to the user selected print time. If the user selected print time is not greater than the new estimated print-time, process 700 may proceed to operation 706, and end. Process 700 may continue to loop through operations 708, 710, and 704 until an estimated print time is equal to less than a user selected print-time.

Figure 8:
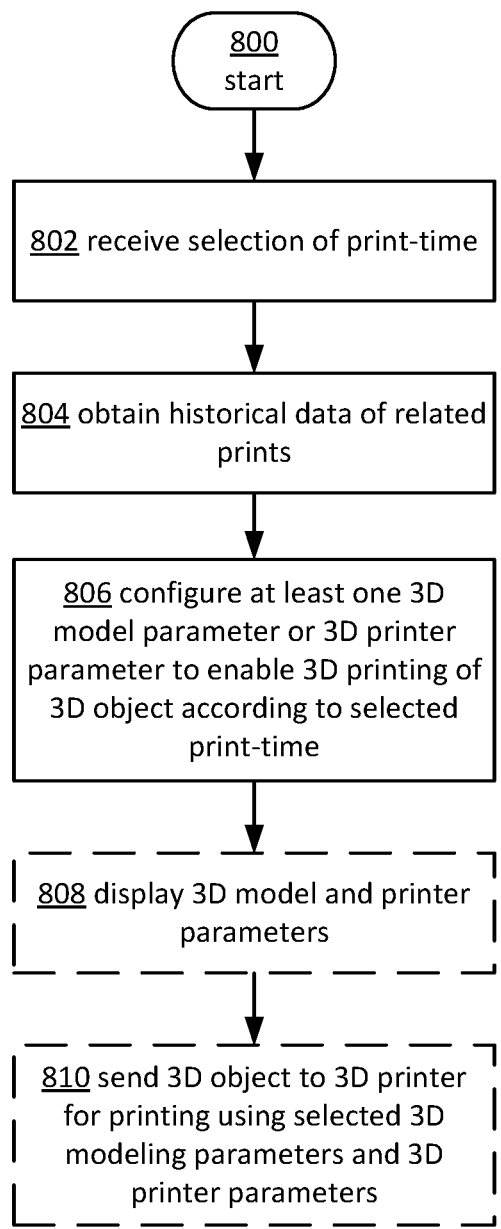
FIG. 8 depicts an example process for configuring one or more 3D modeling parameters or 3D printing parameters to complete the generation of a 3D object within a received print-time.

FIG. 8 depicts an example process 800 for configuring one or more 3D modeling parameters or 3D printing parameters to complete the generation of a 3D object within a received print-time. Process 800 may be performed at least in part by one or more of computing device 102, print-time-application 152, virtual resources 150, and/or 3D printer 104, and/or may utilize UI 200, as described above in reference to FIGS. 1 and 2.

Process 800 may begin at operation 802, where a selection of a print-time for one or more 3D objects may be received, for example, via UI 200. Next, at operation 804, historical data of related print jobs may be obtained. Next, at operation 806, one or more 3D printer or modeling parameters may be configured to enable printing of the one or more 3D objects according to the selected print-time, based on the historical data. In some cases, operations 804 and/or 806 may include aspects of operations 304, 306, 402, 404, 502, 504, 506, 508, 510, and/or 510, as described above. In some cases, operation 806 may include first setting one or more default 3D model or printer parameters, and then modifying one or more of those parameters to meet or exceed the user selected print-time.

In some aspects of process 800, the 3D model and printer parameters, upon configuration, may be displayed to the user, for example, via UI 200. The 3D model of the 3D object may then be communicated to the 3D printer for generation, according to the configured parameters, at operation 810.

Figure 9:
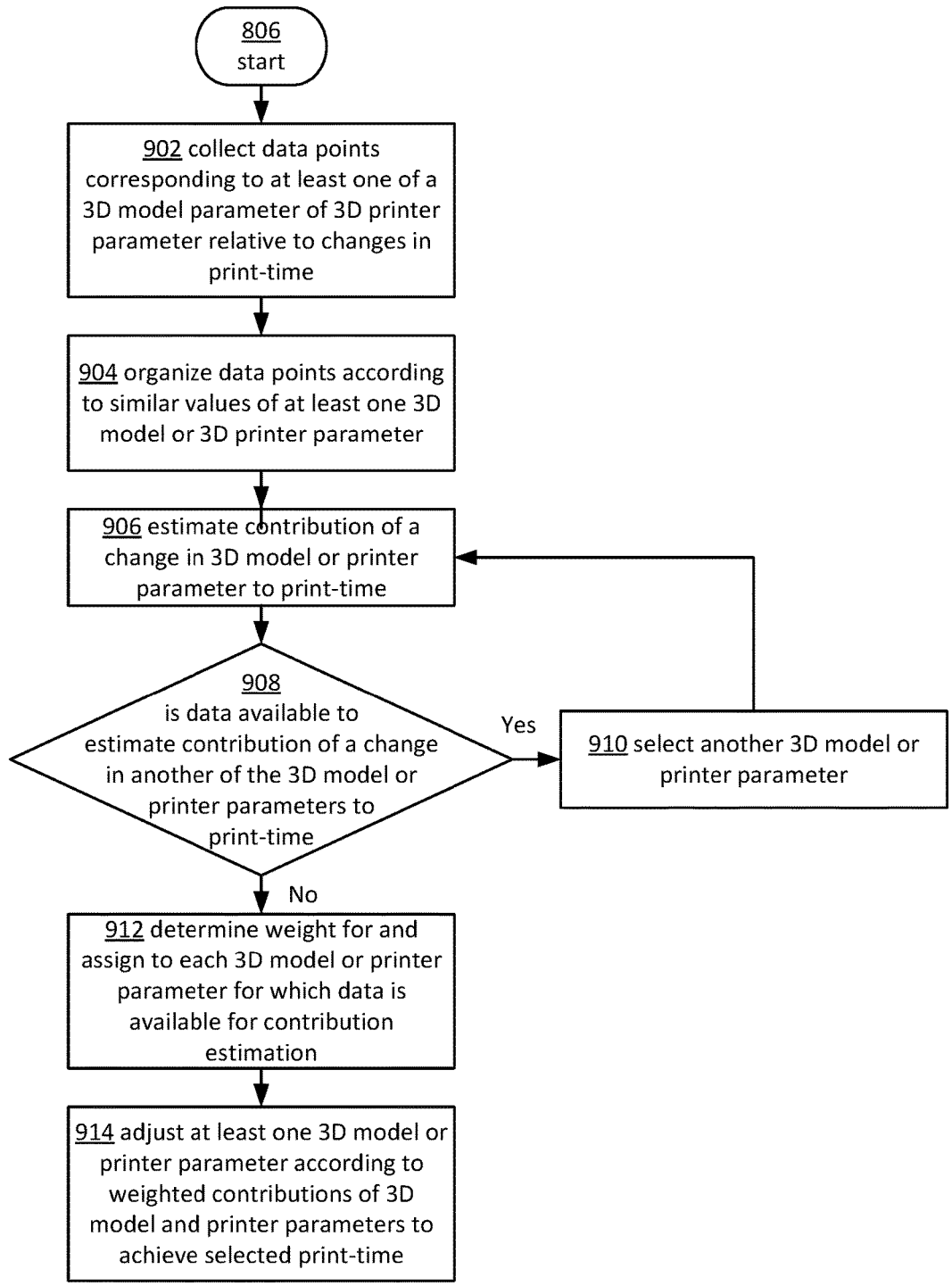
FIG. 9 depicts a more detailed process for configuring one or more 3D modeling parameters or 3D printing parameters to complete the generation of a 3D object within a received print-time based on historical data.

FIG. 9 depicts a more detailed example of operation 806 described above in reference to FIG. 8 for configuring one or more 3D modeling parameters or 3D printing parameters to complete the generation of a 3D object within a received print-time based on historical data. Process 900 may be performed at least in part by one or more of computing device 102, print-time-application 152, virtual resources 150, and/or 3D printer 104, and/or may utilize UI 200, as described above in reference to FIGS. 1 and 2. In one example, operation 806 may include operations 902 through 914, as described below.

At operation 902, one or more data points corresponding to at least one of the configured 3D model or printer parameters of the 3D object to be printed relative to changes in print-time, may be collected. Operation 902 may include one or more aspects of operation 402 describe above. Next, at operation 904, the data points collected may be organized according to one or more similar values of at least one 3D model parameter or 3D printer parameter. In some aspects, operation 904 may include organizing the data points according to which parameters impact print-time the most. Next, at operation 906, the contribution of a change in one 3D model or printer parameter to print-time may be estimated. At operation 908, it may be determined if data is available to estimate the change in print-time based on another parameter. If there is available data, another 3D model or printer parameter may be selected, at operation 910, and a contribution of the new parameter to print-time may be estimated at operation 906. Operation 806 may loop through operations 906, 908, and 910 until data for additional parameters is not available. At this point, operation 806 may proceed to operation 912, where a weight for each 3D model or printer parameter's contribution to print-time may be determined and assigned to each 3D model or printer parameter. Next, at operation 914, one or more 3D model or printer parameters may be adjusted according to the weighted contributions of the parameters to achieve the selected print-time.

Figure 10:
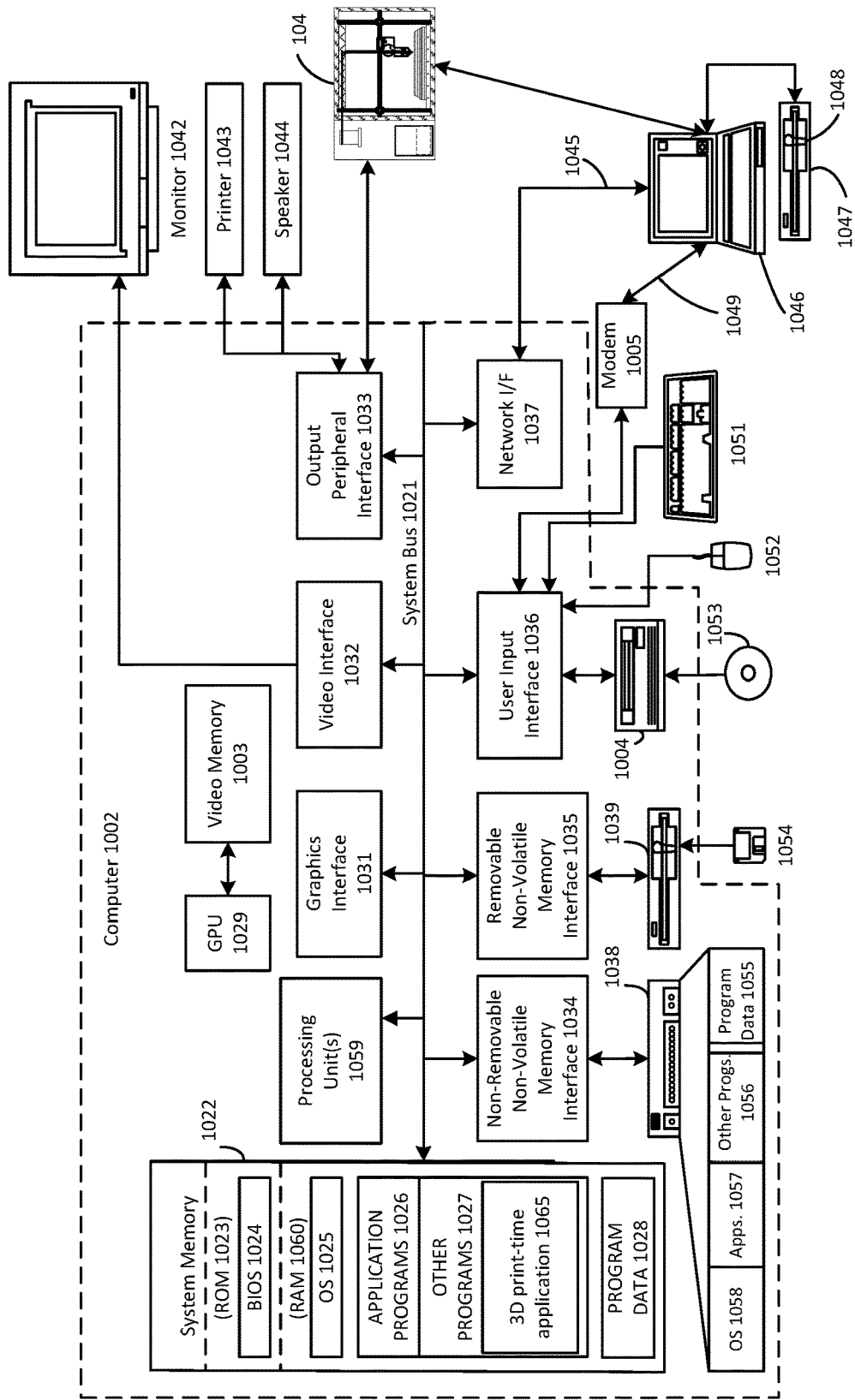
FIG. 10 depicts an example general purpose computing environment in which the techniques described herein may be embodied.

The 3D print-time estimation techniques and any associated user interfaces may be implemented on one or more computing devices or environments, as described below. FIG. 10 depicts an example general purpose computing environment, for example, that may include computing device 110, in which in which some of the techniques described herein may be embodied. The computing system environment 1002 is only one example of a suitable computing environment and is not intended to suggest any limitation as to the scope of use or functionality of the presently disclosed subject matter. Neither should the computing environment 1002 be interpreted as having any dependency or requirement relating to any one or combination of components illustrated in the example operating environment 1002. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1002, which may include any of a mobile device or smart phone, tablet, laptop, desktop computer, or collection of networked devices, cloud computing resources, etc., typically includes a variety of computer-readable media. Computer-readable media can be any available media that can be accessed by computer 1002 and includes both volatile and nonvolatile media, removable and non-removable media. The system memory 1022 includes computer-readable storage media in the form of volatile and/or nonvolatile memory such as read only memory (ROM) 1023 and random access memory (RAM) 1060. A basic input/output system 1024 (BIOS), containing the basic routines that help to transfer information between elements within computer 1002, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027 including a print-time application 1065, and program data 1028.

The computer 1002 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1004 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1004 are typically connected to the system bus 1021 by a removable memory interface, such as interface 1035 or 1036.

The drives and their associated computer storage media discussed above and illustrated in FIG. 10, provide storage of computer-readable instructions, data structures, program modules and other data for the computer 1002. In FIG. 10, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1002 through input devices such as a keyboard 1051 and pointing device 1052, commonly referred to as a mouse, trackball or touch pad. Other input devices (not shown) may include a microphone, joystick, game pad, satellite dish, scanner, retinal scanner, or the like. These and other input devices are often connected to the processing unit 1059 through a user input interface 1036 that is coupled to the system bus 1021, but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, such as a 3D printer 104, which may be connected through an output peripheral interface 933.

The computer 1002 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1002, although only a memory storage device 1047 has been illustrated in FIG. 10. The logical connections depicted in FIG. 10 include a local area network (LAN) 1045 and a wide area network (WAN) 1049, but may also include other networks. Such networking environments are commonplace in offices, enterprise-wide computer networks, intranets, the Internet, and cloud computing resources.

When used in a LAN networking environment, the computer 1002 is connected to the LAN 1045 through a network interface or adapter 1037. When used in a WAN networking environment, the computer 1002 typically includes a modem 1005 or other means for establishing communications over the WAN 1049, such as the Internet. The modem 1005, which may be internal or external, may be connected to the system bus 1021 via the user input interface 1036, or other appropriate mechanism. In a networked environment, program modules depicted relative to the computer 1002, or portions thereof, may be stored in the remote memory storage device. By way of example, and not limitation, FIG. 10 illustrates remote application programs 1048 as residing on memory device 1047. It will be appreciated that the network connections shown are example and other means of establishing a communications link between the computers may be used.

In some aspects, other programs 1027 may include a print-time application 1065 that includes the functionality as described above, such as associated with virtual resources 150, printer controller 110, and/or slicer 165, as described above. In some cases, the print-time application 1065, virtual resources 150, controller 110/slicer 116, and/or other portions of 3D printer 104 may execute some or all operations of processes 300, 400, 600, 700, and/or 800. In some aspects, the print-time application 1065 may communicate with 3D printer 104 to produce a physical 3D object, as described above.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A three-dimensional (3D) printing system comprising:
a display device;
a 3D printer;
a processor communicatively coupled to the display device and the 3D printer; and
a memory communicatively coupled to the processor, storing instructions that when executed by the processor, cause the 3D printing system to perform the following operations:
   receiving at least one of a 3D model parameter or a 3D printer parameter for generating a 3D object by a selected 3D printer based on a 3D model;
   obtaining historical print-time data for generating other 3D objects by the selected 3D printer or another 3D printer, wherein the historical print-time data is associated with at least one of a 3D model parameter or a 3D printer parameter;
   determining, based on the received at least one of the 3D model parameter or the 3D printer parameter and the obtained historical print-time data, an estimated print-time for generating the 3D object by the 3D printer, before slicing the 3D model by the 3D printer;
   displaying the estimated print-time, wherein modification of the at least one 3D model parameter or 3D printer parameter causes the estimated print-time to change to a second estimated print-time;
   receiving a selection of a user print-time for generating the 3D object by the 3D printer;
   automatically adjusting, based on the historical print-time data, the estimated print-time, and the user selected print time, at least one of the 3D model parameter or the 3D printer parameter to modify the estimated print-time to be equal to or less than the user selected print-time; and
   generating the 3D object according to the adjusted at least one of 3D model parameter or 3D printer parameter.

2. The 3D printing system of claim 1, wherein the 3D printer is communicatively coupled to the processor.

3. The 3D printing system of claim 1, wherein the historical print-time data is obtained from the memory or from a remote data store.

4. A method for determining, by a computing device, an estimated print-time for generating a 3D object, the method comprising:
   receiving at least one of a 3D model parameter or a 3D printer parameter for generating a 3D object by a selected 3D printer based on a 3D model;
   obtaining historical print-time data for generating other 3D objects by the selected 3D printer or another 3D printer, wherein the historical print-time data is associated with at least one of a 3D model parameter or a 3D printer parameter; and
   determining, based on the received at least one of the 3D model parameter or the 3D printer parameter and the obtained historical print-time data, an estimated print-time for generating the 3D object by the 3D printer, before slicing the 3D model by the 3D printer;
   displaying the estimated print-time, wherein modification of the at least one 3D model parameter or 3D printer parameter causes the estimated print-time to change to a second estimated print-time;
   receiving a selection of a user print-time for generating the 3D object by the 3D printer;
   automatically adjusting, based on the historical print-time data, the estimated print-time, and the user selected print time, at least one of the 3D model parameter or the 3D printer parameter to modify the estimated print-time to be equal to or less than the user selected print-time; and
   generating the 3D object according to the adjusted at least one of 3D model parameter or 3D printer parameter.

5. The method of claim 4, further comprising:
   receiving at least one second 3D model parameter or 3D printer parameter for generating the 3D object by the 3D printer based on the 3D model; and
   adjusting, based on the received at least one of the second model parameter or the second 3D printer parameter and the obtained historical print-time data, the estimated print-time for generating the 3D object by the 3D printer.

6. The method of claim 4, further comprising:
   displaying, in a graphical user interface, at least one of the 3D model parameter or the 3D printer parameter and the estimated print-time, wherein the estimated print-time changes in real-time or near real-time responsive to a change in at least one of the 3D model parameter or the 3D printer parameter.

7. The method of claim 4, wherein the 3D model parameter comprises at least one of: a mesh count of the 3D model, a triangle count of the 3D model, or a bounding box of the 3D model; and the 3D printer parameter comprises at least one of: a quality setting, a density setting, a raft setting, a support setting, a 3D printer type, a number of materials to be used to generate the 3D object, or material information for generating the 3D object.

8. The method of claim 4, wherein determining, based on the received at least one of the 3D model parameter or the 3D printer parameter and the obtained historical print-time data, the estimated print-time for generating the 3D object by the 3D printer further comprises:
   collecting data points corresponding to at least one of the 3D model parameter or the 3D printer parameter relative to changes in the print-time; and
   using machine learning based on the collected data points to optimize the estimated print-time based on the at least one of the 3D model parameter or the 3D printer parameter and the historical print-time data.

9. The method of claim 4, further comprising:
wherein the 3D model parameter comprises two or more of the following: a mesh count of the 3D model, a triangle count of the 3D model, or a bounding box of the 3D model; and the 3D printer parameter comprises at least one of: a quality setting, a density setting, a raft setting, a support setting, a 3D printer type, a number of materials to be used to generate the 3D object, or material information for generating the 3D object.

10. The method of claim 9, further comprising:
displaying, in a graphical user interface, at least one of the 3D model parameter or the 3D printer parameter, wherein at least one of the 3D model parameter or the 3D printer parameter changes in real-time or near real-time when a second user print-time selection is received.

11. The method of claim 9, further comprising:
determining a confidence level associated with completion of 3D printing of the 3D object based on at least one of the 3D model parameter or the 3D printer parameter and the historical print-time data;
comparing the determined confidence level to a confidence level threshold; and
adjusting at least one of the 3D model parameter or the 3D printer parameter based on the comparing.

12. The method of claim 11, further comprising:
determining an adjusted confidence level associated with completion of 3D printing of the 3D object based on at least one of the adjusted 3D model parameter or the adjusted 3D printer parameter and the historical print-time data; and
displaying, in a graphical user interface, at least one of the adjusted 3D model parameter or the adjusted 3D printer parameter and at least one of the determined confidence level or the adjusted confidence level, wherein at least one of the 3D model parameter or the 3D printer parameter changes in real-time or near real-time when a second user print time selection is received.

13. A method for adjusting, by a computing device, one or more parameters for 3D printing a 3D object based on a selected print time, the method comprising:
receiving, by the computing device, a selection of a print time for generating a 3D object by a selected 3D printer based on a 3D model;
obtaining historical print-time data for generating other 3D objects by the selected 3D printer or another 3D printer, wherein the historical print-time data is associated with at least one of a 3D model parameter or a 3D printer parameter;
configuring, based on the historical data, at least one of the 3D model parameter or the 3D printer parameter for 3D printing the 3D object within the received selected print time; and
displaying, in a graphical user interface, at least one of the 3D model parameter or the 3D printer parameter, wherein at least one of the 3D model parameter or the 3D printer parameter changes in real-time or near real-time when a second print time selection is received.

14. The method claim 13, wherein configuring at least one of the 3D model parameter or the 3D printer parameter for 3D printing the 3D object based on the historical data within the received print time further comprises:
determining a first estimated print time based on one or more default or received values for at least one of the 3D model parameter or the 3D printer parameter, based on the historical data;
comparing the first estimated print time with the selected print time; and
based on the comparison, adjusting at least one value for at least one of the 3D model parameter or the 3D printer parameter to adjust the first estimated print time to be equal to or less than the selected print time.

15. The method of claim 13, wherein the 3D model parameter comprises at least one of: a mesh count of the 3D model, a triangle count of the 3D model, or a bounding box of the 3D model; and the 3D printer parameter comprises at least one of: a quality setting, a density setting, a raft setting, a support setting, a 3D printer type, a number of materials to be used to generate the 3D object, or material information for generating the 3D object.

16. The method of claim 13, further comprising:
based on the configuring, causing the 3D printing of the 3D object within the received print time.

17. The method of claim 13, further comprising:
determining a confidence level associated with completion of 3D printing of the 3D object based on at least one of the configured 3D model parameter or 3D printer parameter for 3D printing the 3D based on the historical data;
comparing the determined confidence level to a confidence level threshold; and
adjusting at least one of the configured 3D model parameter or 3D printer parameter based on the comparing.

18. The method of claim 17, further comprising:
displaying, in a graphical user interface, at least one of the 3D model parameter or the 3D printer parameter and at least one of the determined confidence level or the adjusted confidence level, wherein at least one of the 3D model parameter or the 3D printer parameter changes in real-time or near real-time when a second print time selection is received.

19. The method of claim 13, wherein configuring at least one of the 3D model parameter or the 3D printer parameter for 3D printing the 3D object based on the historical data within the received print time is performed prior to slicing the 3D model for 3D printing by the 3D printer.

20. The method of claim 13, wherein configuring at least one of the 3D model parameter or the 3D printer parameter for 3D printing the 3D object based on the historical data within the received print time further comprises;
collecting data points corresponding to at least one of the 3D model parameter or the 3D printer parameter relative to changes in the print time; and
using machine learning based on the collected data points to optimize configuring at least one of the 3D model parameter or the 3D printer parameter for 3D printing the 3D object based on the historical data within the received print time.

* * * * *